United States Patent Office 3,081,188
Patented Mar. 12, 1963

3,081,188
COPPER PHTHALOCYANINE PIGMENTS CRYSTALLIZATION- AND FLOCCULATION-RESISTANT IN THE α-FORM AND PROCESS FOR THEIR MANUFACTURE
Guenther Zwahlen, Arlesheim, Switzerland, assignor to Ciba Limited, Basel, Switzerland, a Swiss company
No Drawing. Filed Sept. 26, 1960, Ser. No. 58,177
Claims priority, application Switzerland Sept. 29, 1959
5 Claims. (Cl. 106—288)

Among the various modifications of copper phthalocyanine the α-form is known to have the reddest shade and the highest tinctorial power. However, the α-form has the disadvantage that it is not in general resistant to solvents, so that in the presence of many of the solvents used in the lacquer industry, such as benzene, toluene or xylene, it changes fairly rapidly by recrystallization into the more greenish β-form. The large needles of the β-form so produced considerably reduce the tinctorial strength of the pigment and render it practically valueless.

A further disadvantage of the α-form is its great tendency to flocculate. Due to this the pigment particles dispersed in a liquid agglomerate to form larger particles, which also considerably reduces the tinctorial power of the pigment. Various tests have been devised for determining the flocculation of a pigment. One such test consists, for example, in dispersing 10 parts of copper phthalocyanine and 90 parts of titanium dioxide in an oil-modified alkyd resin and the lacquer is poured on to a support. Shortly after the film has dried it is rubbed with the finger. If the rubbed part of the film is stronger in color than the unrubbed part, flocculation has occurred.

Many attempts have been made to obtain crystallization resistant and flocculation resistant copper-phthalocyanine. Thus, for example, copper phthalocyanine has been mixed with tin phthalocyanine. In order to obtain a mixture that is sufficiently resistant to crystallization and flocculation to meet practical requirements, at least 12 percent of tin phthalocyanine, calculated on the mixture, must be used. As tin phthalocyanine is considerably less fast to light and migration than copper phthalocyanine and also has an undesired strongly greenish blue tint, such a high content of tin phthalocyanine has a very unfavorable effect on the tint and fastness to light and migration of the pigment.

The present invention is based on the observation that manganese phthalocyanine has a considerably better stabilising action than tin phthalocyanine, and, in contradistinction to the latter, is fast to light and migration, and does not have the undesired greenish tint.

Accordingly, the invention provides crystallization- and flocculation-resistant copper phthalocyanine pigments, which comprise an intimate mixture of at least 80 percent of copper phthalocyanine and/or copper low-halogenated phthalocyanine and 0.5 to 10 percent of manganese phthalocyanine. All the percentages herein are by weight. In addition to these two principal components the pigments may contain a small proportion of another metal phthalocyanine or metal phthalocyanines, for example, those of tin, aluminum, magnesium, titanium or vanadium.

The pigments advantageously comprise 90 to 95 percent of copper phthalocyanine and/or copper monochloror monobromo-phthalocyanine and 2 to 5 percent of manganese phthalocyanine.

It is essential for a good resistance to crystallization and flocculation that the components should be very intimately mixed together. This is advantageously achieved by grinding the components, and advantageously using as starting materials the β-forms of the metal phthalocyanines, such as are obtained by the usual methods of synthesis. It is desirable to use a method of grinding that leads directly to highly dispersed α-forms. This can be accomplished by treating the crude pigments in a grinding or kneading apparatus in known manner in the presence of an easily removable grinding substratum, for example, an inorganic or organic salt, such as sodium sulfate, sodium chloride or sodium acetate. Especially advantageous is the conditioning process wherein the pigment mixture is ground in aqueous suspension in the presence of an organic grinding substratum which is solid under the grinding conditions capable of subliming, especially hexachlorethane, whereby a highly dispersed and stable α-form is obtained in a relatively short grinding period.

The individual components may be separately conditioned by the methods described above and subsequently mixed together mechanically.

Another method of obtaining a homogeneous mixture is to heat a phthalic acid derivative, which is capable of forming phthalocyanine with or without a nitrogen donor, for example, phthalonitrile or phthalimide and urea, with a mixture of salts of copper and manganese, if desired, in the presence of another heavy metal salt, for example, a tin salt. In this case the β-forms are obtained, which must be conditioned and converted into the α-forms in known manner.

As manganese phthalocyanine is converted by concentrated sulfuric acid into metal-free phthalocyanine, which has no stabilizing action, pigment mixtures that contain manganese phthalocyanine cannot be converted into the α-modification by reprecipitation from concentrated sulfuric acid. The conversion should, therefore, be carried out by heating the pigment mixture for a relatively long period in dilute sulfuric acid, such as aqueous sulfuric acid of 15 to 30 percent, for example, about 20 percent, strength. Under these conditions no decomposition of manganese phthalocyanine occurs.

The pigments of this invention possess a resistance to crystallization and flocculation that meets the highest requirements, and they are therefore suitable for all applications of pigments, and especially in lacquers and spinning solutions.

The following examples illustrate the invention, the parts and percentages being by weight:

*Example 1*

A laboratory-type attritor mill is charged with 62 parts of water, 14 parts of finely powdered hexachloroethane, 0.7 part of a manganese phthalocyanine containing per molecule one chlorine atom bound in salt-like fashion (prepared by heating a mixture of 59.2 parts of phthalic anhydride, 100 parts of urea, 18.7 parts of manganese dichloride, 1 part of ammonium molybdate and 200 parts of trichlorobenzene for 6 hours at 180° C. and then for 8 hours at 220° C.) and 64 parts of a filter cake still moist with water which contains 13.3 parts of α-copper phthalocyanine. After grinding for 24 hours the mill is emptied, rinsed with water and the resulting suspension is freed from hexachloroethane by steam distillation. The remaining aqueous pigment suspension is filtered and the filter cake is washed with water and then dried in a vacuum cabinet at 80° C. As revealed by its X-ray diffraction diagram the resulting dry pigment is in the α-modification.

The dry pigment, which is very easy to squash to form a soft powder, is tested for its crystallization stability in the following manner.

Stage 1: A suspension of 0.5 gram of the pigment in 10 cc. of xylene is heated for 30 minutes at 100° C., cooled, filtered, and the filter residue is washed with ethanol and dried in a vacuum cabinet at 60° C. As revealed by its X-ray diffraction diagram the pigment mixture is still in the pure α-modification.

Stage 2: A suspension of 0.5 gram of the dry pigment in 10 cc. of xylene is refluxed for one hour at 132° C., then worked up and subjected to X-ray examination as in stage 1. The pigment mixture is still in the pure α-modification.

Stage 3: The pigment is refluxed in xylene for 2 hours. X-ray result: 100% α-modification, trace of β-modification.

Stage 4: The pigment is refluxed in xylene for 4 hours. X-ray result: 95% of α-modification.

Apart from its good crystallization stability this pigment is also very resistant to flocculation.

Example 2

A laboratory-type attritor mill is charged with 112 parts of water, 14 parts of finely powdered hexachloroethane, 13.3 parts of crude β-copper phthalocyanine and 0.7 part of a manganese phthalocyanine containing per molecule one chlorine atom bound in salt-like fashion. After grinding for 96 hours at 15–20° C. the needles of the starting pigment, which were originally 100–200μ long, have disappeared completely. The dyestuff has been absorbed by the hexachloroethane in a very fine state of division, while at the same time the β-modification has been transformed to the α-modification. The mill is then emptied and the aqueous suspension worked up as described in Example 1.

The resulting pigment mixture is tested for its crystallization stability as described in Example 1; it is observed that also this pigment, after having been stirred for 30 minutes in xylene at 100° C. (test stage 1) is still present in the pure α-modification. This pigment still has likewise good resistance to flocculation.

Example 3

A laboratory-type attritor mill is charged with 62 parts of water, 14 parts of finely powdered hexachloroethane, 64 parts of a filter cake still moist with water containing 13.3 parts of α-copper phthalocyanine and 0.7 part of manganese phthalocyanine, prepared by heating 60 parts of phthalonitrile with 12 parts of manganese dioxide for 3 hours at 240° C. After having been ground for 24 hours the pigment mixture is worked up as described in Example 1 and tested for its crystallization stability. X-ray result: Stage 1—100% of α-modification.

This pigment has likewise good resistance to flocculation.

Example 4

The method described in Example 2 is used except that 0.7 part of manganese phthalocyanine free from chlorine is used instead of 0.7 part of manganese phthalocyanine containing chlorine. Crystallization stability: Stage 1—100% of α-modification. Good resistance to flocculation.

Example 5

In a laboratory-type kneader a mixture of 120 parts of finely ground sodium chloride, 28.5 parts of α-copper phthalocyanine, 1.5 parts of a manganese phthalocyanine containing per molecule one atom of chlorine bound in salt-like fashion, and 50 parts of isopropanol is kneaded for 24 hours with cooling. The dough is taken up in 1 liter of hot water, stirred for one hour, filtered and washed with water until it is free from chlorine ions. The filter cake is dried in a vacuum cabinet at 60° C., and the resulting pigment is tested for its crystallization stability as described in Example 1. X-ray result: Stage 1—100% of α-modification.

Example 6

The method is the same as in Example 5 except that 1.5 parts of manganese phthalocyanine free from chlorine are used instead of 1.5 parts of manganese phthalocyanine containing chlorine. Crystallization stability: Stage 1—100% of α-modification.

Example 7

In a laboratory-type kneader a mixture of 120 parts of finely powdered sodium chloride, 28.5 parts of crude β-copper phthalocyanine, 1.5 parts of a manganese phthalocyanine containing per molecule one atom of chlorine bound in salt-like fashion, and 50 parts of isopropanol is kneaded and cooled until the β-modification of copper phthalocyanine has been converted to the α-modification. The dough is then worked up as described in Examples 5 and 6 and the resulting pigment is tested for its crystallization stability. X-ray result: Stage 1—100% of α-modification.

Example 8

A mixture of 84 parts of phthalonitrile, 8.9 parts of copper chloride and 0.9 part of manganese dioxide is stirred for 6 hours at 240–250° C. After cooling, the solidified reaction mass is taken up in trichlorobenzene, heated to 100° C. and filtered while still hot. The filter cake is washed with ethanol and boiled with dilute sodium hydroxide solution and then with dilute hydrochloric acid. After having been washed neutral the filter cake is dried in a vacuum cabinet at 80° C. Yield: about 90% of the theoretical.

The resulting pigment is a mixture consisting of 94.8% of copper phthalocyanine and 5.2% of manganese phthalocyanine, said mixture being in the β-modification.

Example 9

14 parts of the pigment mixture obtained in Example 8 are converted in a laboratory-type attritor mill with 14 parts of finely powdered hexachloroethane and 112 parts of water by being ground for 72 hours at 15–20° C. to the α-modification. The mill is emptied, rinsed with water and the resulting suspension is filtered. The washed filter cake is heated in a vacuum cabinet to 100° C., whereupon at first predominantly the water and then the hexachloroethane are removed substantially completely. The resulting dry pigment is tested for its crystallization stability as described in Example 1. X-ray result: Stage 1—100% of α-modification.

Example 10

5 parts of the pigment mixture obtained in Example 8 are stirred in 100 parts of sulfuric acid of 22% strength for 10 hours at 85–90° C. The acid suspension is filtered and the residue is washed neutral and then dried in a vacuum cabinet at 60° C. The resulting pigment is revealed by its X-ray diffraction diagram to contain 95–100% of the α-modification; it is tested for its crystallization stability. X-ray result: Stage 1—95–100% of α-modification.

When the mixture is stirred for only 5 hours at about 90° C. a pigment is obtained in which 50% of the β-form has been converted to another modification. The share so converted is neither the α-modification nor the β-modification but its crystallization stability is equal to that of the above-mentioned α-modifications.

Example 11

A laboratory-type attritor mill is charged with 61 parts of water, 13 parts of finely powdered hexachloroethane, 64 parts of a filter cake still moist with water containing 13.16 parts of α-copper phthalocyanine, 0.42 part of a manganese phthalocyanine containing per molecule one atom of chlorine bound in salt-like fashion (obtained by heating 59.2 parts of phthalic anhydride, 100 parts of urea, 18.7 parts of manganese dichloride, 1 part of ammonium molybdate and 200 parts of trichlorobenzene for 6 hours at about 180° C. and then for 8 hours at 220° C.) and 0.42 part of dichlorotin phthalocyanine ($SnCl_2$—Pc prepared by heating 59.2 parts of phthalic anhydride, 100 parts of urea, 28 parts of tin dichloride, 1 part of ammonium molybdate and 200 parts of trichlorobenzene for 6 hours at about 180° and then for 8 hours at 220° C.).

After grinding for 24 hours the mill is emptied, rinsed with water and the resulting suspension is freed from hexachloroethane by steam distillation. The remaining aqueous pigment suspensions is filtered and the filter cake is washed with water and then dried in a vacuum cabinet at 80° C.

X-ray results:
    Stage 1—100% of α-modification
    Stage 2—100% of α-modification
    Stage 3—100% of α-modification
    Stage 4—100% of α-modification
    Stage 5—80% of α-modification

*Example 12*

A laboratory-type attritor mill is charged with 112 parts of water, 14 parts of finely powdered hexachloroethane, 13.16 parts of crude β-copper phthalocyanine, 0.42 part of a manganese phthalocyanine containing per molecule one atom of chlorine bound in salt-like fashion, and 0.42 part of dichloro tin phthalocyanine. After grinding for 96 hours at 15–20° C. the needles of the starting pigment, which were originally 100–200μ long, have disappeared completely. The dyestuff is taken up in a very fine state of distribution by the hexachloroethane, while at the same time the β-modification is transformed to the α-modification. The mill is then emptied and the aqueous suspension worked up as described in Example 1.

The resulting pigment mixture is tested for its crystallization stability as described in Example 1; it is found that also this pigment is still in the pure α-modification after having been stirred for 30 minutes in xylene at 100° C. (test stage 1). This pigment is likewise very stable to flocculation.

*Example 13*

A laboratory-type attritor mill is charged with 62 parts of water, 14 parts of finely powdered hexachloroethane, 64 parts of a filter cake still moist with water containing 13.16 parts of α-copper phthalocyanine, 0.42 part of tin dihydroxyphthalocyanine (obtained from $SnCl_2$—Pc by boiling in ammonia) and 0.42 part of manganese phthalocyanine (obtained by heating 60 parts of phthalonitrile with 12 parts of manganese dioxide for 3 hours at 240° C.). After grinding for 24 hours the pigment mixture is worked up as described in Example 1 and tested for its crystallization stability.

X-ray results:
    Stage 1—100% α-modification
    Stage 2—100% α-modification
    Stage 3—95% α-modification This pigment is likewise very resistant to flocculation.

*Example 14*

The mixture described in Example 12 is worked up as described in that example with the exception that 0.42 part of tin dihydroxyphthalocyanine is used instead of 0.42 part of dichloro tin phthalocyanine. Crystallization stability: Stage 1—100% α-modification. This pigment likewise displays good resistance to flocculation.

*Example 15*

The mixture described in Example 12 is worked up as described in that example with the exception that 0.42 part of manganese phthalocyanine free from chlorine is used instead of 0.42 part of manganese phthalocyanine contianing chlorine. Crystallization stability: Stage 1—100% α-modification.

*Example 16*

In a laboratory-type kneader a mixture of 120 parts of finely ground sodium chloride, 28.2 parts of α-copper phthalocyanine, 0.9 part of a manganese phthalocyanine containing per molecule one atom of chlorine bound in salt-like fashion, 0.9 part of tin dichlorophthalocyanine and 50 parts of isopropanol is kneaded for 24 hours while being cooled. The dough is taken up in 1 liter of hot water, stirred for one hour, then filtered and washed with water until it is free from chlorine ions. The filter cake is dried in a vacuum cabinet at 60° and the resulting pigment is tested for its crystallization stability as described in Example 1. X-ray result: Stage 1—100% α-modification.

*Example 17*

In a laboratory-type kneader a mixture of 120 parts of finely powdered sodium chloride, 28.2 parts of crude β-copper phthalocyanine, 0.9 part of tin dihydroxyphthalocyanine, 0.9 part of a maganese phthalocyanine containing per molecule one atom of chlorine bound in salt-like fashion, and 50 parts of isopropanol is kneaded until the β-modification of copper phthalocyanine has been completely transformed to the α-modification. The dough is then worked up as described in Example 16 and the resulting pigment is tested for its crystallization stability. X-ray result: Stage 1—100% α-modification.

*Example 18*

A mixture of 14 parts of the pigment mixture obtained in Example 8, 14 parts of finely powdered hexachloroethane, and 112 parts of water is ground in an attritor mill for 24 hours at 45° C. The hexachloroethane is removed from the dough by steam distillation, whereupon a finely divided pigment suspension is obtained. The pigment is in the β-modification.

The conditioned pigment mixture is transformed to the α-modification to an extent of about 95% as described in the first paragraph of Example 10. Stability: Stage 1—about 95% α modification.

What is claimed is:

1. Copper phthalocyanine-pigments, which are crystallization- and flocculation-resistant in the α-form consisting essentially of an intimate mixture of at least 80 percent of a member selected from the group consisting of copper phthalocyanine, mono-halogenated copper phthalocyanine, and mixtures thereof, and 0.5 to 10 percent of manganese phthalocyanine.

2. Copper phthalocyanine pigments as claimed in claim 1, in which the copper phthalocyanine component is a member selected from the group consisting of copper phthalocyanine, copper monochloro- and monobromo-phthalocyanine, and mixtures thereof.

3. Copper phthalocyanine pigments as claimed in claim 1, consisting essentially of 90 to 95 percent of the copper phthalocyanine component, and 2 to 5 percent of manganese phthalocyanine.

4. Copper phthalocyanine pigments as claimed in claim 1, consisting essentially of at least 80 percent of the copper phthalocyanine component, 0.5 to 10 percent of manganese phthalocyanine, and 0.5 to 10 percent of tin phthalocyanine.

5. Copper phthalocyanine pigments as claimed in claim 1, consisting essentially of 90–95 percent of the copper phthalocyanine component, 2 to 5 percent of the manganese phthalocyanine, and 2 to 5 percent of tin phthalocyanine.

References Cited in the file of this patent

UNITED STATES PATENTS

| 2,476,950 | Beard | July 26, 1949 |
| 2,713,005 | Baunsgaard et al. | July 12, 1955 |
| 2,891,964 | Roberts | June 23, 1959 |

FOREIGN PATENTS

| 551,607 | Canada | Jan. 14, 1958 |